United States Patent [19]

Arroyo

[11] Patent Number: 4,730,894
[45] Date of Patent: Mar. 15, 1988

[54] OPTICAL FIBER CABLE HAVING A PREFABRICATED STRENGTH SYSTEM AND METHODS OF MAKING

[75] Inventor: Candido J. Arroyo, Gwinnett County, Ga.

[73] Assignee: American Telephone and Telegraph Company, AT&T Bell Laboratories, Murray Hill, N.J.

[21] Appl. No.: 845,105

[22] Filed: Mar. 27, 1986

[51] Int. Cl.$^4$ .............................................. G02B 6/44
[52] U.S. Cl. .................................................. 350/96.23
[58] Field of Search ...................................... 350/96.23

[56] References Cited

U.S. PATENT DOCUMENTS

| 4,461,540 | 7/1984 | Franken .......................... | 350/96.23 |
| 4,491,387 | 1/1985 | Dey et al. ....................... | 350/96.23 |
| 4,557,560 | 12/1985 | Bohannon, Jr. et al. ......... | 350/96.23 |

FOREIGN PATENT DOCUMENTS

| 0175013 | 9/1985 | Japan ................................ | 350/96.23 |

*Primary Examiner*—Eugene R. LaRoche
*Assistant Examiner*—James C. Lee
*Attorney, Agent, or Firm*—Edward Somers

[57] ABSTRACT

An optical fiber cable includes a core (22) comprising at least one optical fiber, a plastic tubular member (28) which encloses the core, a jacket (54) which encloses the tubular member and a prefabricated strength system which is interposed between the jacket and the tubular member. The strength system includes a carrier tape (82) which may be comprised of woven glass or impregnated woven glass, for example, and which is wrapped longitudinally about the tubular member. The carrier tape has an adhesive material disposed on one surface thereof for causing a plurality of longitudinally extending strength members (86—86) to remain attached to the tape while the jacket is being extruded over the strength system. In one embodiment, a metallic shield system (52) is disposed about the tubular member and the prefabricated strength system is disposed in engagement with an outer surface of the shield system.

29 Claims, 21 Drawing Figures

Fig_4

Fig_2
PRIOR ART

Fig_3
PRIOR ART

Fig_18B

Fig_18A

Fig_5

Fig_8

Fig_9

Fig_10

Fig_11

Fig_16A

Fig_16B

Fig_17

OPTICAL FIBER CABLE HAVING A PREFABRICATED STRENGTH SYSTEM AND METHODS OF MAKING

TECHNICAL FIELD

This invention relates to an optical fiber cable having a prefabricated strength system and to methods of making the cable. More particularly, it relates to an optical fiber cable which is provided with a strength system that includes a carrier tape which holds a plurality of longitudinally extending strength members in a predetermined relationship to one another while a jacket is extruded about the tape.

BACKGROUND OF THE INVENTION

Optical fibers are in widespread use today as transmission media because of their large bandwidth capabilities and small size. However, they are mechanically fragile, exhibiting low strain fracture under tensile loading and degraded light transmission when bent. Accordingly, cable structures have been developed to protect mechanically the optical fibers thereby rendering them a realizeable transmission medium.

An optical fiber cable must be capable of withstanding tensile loads applied when the cable is pulled into ducts, for example, and bending stresses caused when the cable is pulled through turns in the ducts and bent when being introduced through manholes. An optical fiber cable suitable for such use is disclosed in R. A. Kempf et al U.S. Pat. No. 4,078,853 which issued on Mar. 14, 1978. In one embodiment, a core of optical fiber ribbons is surrounded by a plastic, loose-fitting inner jacket, a compliant layer of plastic twine and a plastic outer jacket which is reinforced with primary strength members that are wrapped about the twine. The strength members are embedded in the outer jacket to achieve substantial coupling therewith.

In some situations, increased tensile loads may be encountered, such as, for example, where ducts are extremely conjested or where the ducts have more bends than usual. If more strength members are added to the above-described cable to meet these increased requirements, bending flexibility which is so necessary to ease cable handling and installation decreases. A cable which is capable of resisting relatively high tensile loads while exhibiting bending flexibility is disclosed in U.S. Pat. No. 4,241,979 which issued on Dec. 30, 1980 in the names of P. F. Gagen and M. R. Santana. In it, the coupling between the strength members and an outer plastic jacket is precisely controlled. A bedding layer of material, about which the strength members are wrapped helically, is added between a plastic inner jacket and the outer jacket to control the extent to which the strength members are encapsulated by the outer jacket. By preventing encapsulation of portions of the strength members, the strength members are still tightly coupled to the outer jacket under a tensile load, but are capable of sliding with respect to the outer jacket under local bending where no encapsulation occurs. Under tensile loading, sliding is eliminated substantially because sufficient shear and frictional coupling exist between the outer jacket and the strength members. In one embodiment, two reinforcement strength member layers are wrapped helically in opposite directions. Under a tensile load, these two layers of strength members produce equal but oppositely directed torques about the longitudinal axis is the cable to ensure the absence of torsional creep under sustained tensile loads.

Optical fiber cables also may be strung between poles or buried in the ground thus exposing them to abuse such as, for example, attack by rodents, mechanical abrasion and crushing. Rodents have been able to encompass the cable with their teeth and pull open the seam of a steel shield intended for rodent protection. Moisture which enters the cable through rodent-caused openings in the jacket causes the common grade steel shield to corrode.

Both buried and aerial cables also are damaged by lightning strikes. Thermal damage, that is burning, charring and melting of the sheath components, is caused by the heating effects of the lightning arc and a current being carried to ground by the metallic members of the core or sheath. A second mode of lightning damage is mechanical, causing crushing and distortion of the sheath. This results from an explosive impact, sometimes called a steamhammer effect, which is caused by the instantaneous vaporization of water in the earth in a lightning channel to the cable.

A cable which provides suitable protection against rodents and lightning is disclosed in U.S. Pat. No. 4,557,560 which issued on Dec. 10, 1985 in the names of W. D. Bohannon Jr. et al. In it, a core is enclosed in a shield made of a highly conductive material such as copper, for example, and in a corrugated outer shield comprising a corrosion-resistant metallic material such as stainless steel to which is bonded an outer jacket. Even if the outer jacket is violated by rodents and the outer shield is exposed, the stainless steel does not corrode and the integrity of the inner portions of the cable is preserved. Also, the bonding of the jacket to the outer shield helps to prevent lifting of the seam by rodents.

As should be apparent, this last design cable and others which are commercially available have added lightning and rodent sheath protection to an existing cable design. This has resulted in a cable which may be unnecessarily large in outer diameter and one which may require excessive manufacturing floor space, material and labor. In Appl. Ser. No. 825,291 which was filed on Jan. 31, 1986 in the names of W. D. Bohannon, Jr. et al, an optical fiber core is enclosed in a sheath system which includes a single metallic shield enclosed by a plastic jacket. A plurality of individual longitudinally extending strength members are caused to be disposed in engagement with the shield. This last-described arrangement results in a cable having a significantly smaller diameter than prior art cables. However, the manufacture of a cable in which wire-like strength members are wrapped about an advancing core requires the use of a relatively low line speed.

What is needed and what seemingly is not provided by the prior art is an optical fiber cable having a strength system which may be manufactured simply and inexpensively with existing equipment. The sought-after strength system should be one which easily is integrated with other elements of a cable and with different shield systems depending on the anticipated use of the cable.

SUMMARY OF THE INVENTION

The foregoing problems have been overcome by the cable of this invention which includes a core comprising at least one optical fiber. A strength member system is disposed about the core and includes a carrier tape and a plurality of longitudinally extending strength members spaced about the periphery of the core. The strength member system has sufficient resistance to tensile and compressive forces to prevent damage to the at least one optical fiber. The cable also includes a jacket which is made of a plastic material and which encloses the strength system. The tape is effective to hold the strength members in a predetermined relationship to one another while the jacket is being extruded about the strength member system.

The strength members may be disposed in several configurations. In a preferred embodiment, they are assembled to the tape in an undulated configuration so that when the tape is wrapped about the core, the strength members have a reverse oscillated lay. In another embodiment, the strength members are disposed parallel to longitudinal edge surfaces of the carrier tape so that when the tape is wrapped about the core, the strength members have a layless configuration. Of course, the carrier tape in which the strength members are disposed parallel to a longitudinal edge of the tape may be wrapped helically about the core.

The strength member system also may be used in shielded cables. In those instances, the shield or shielding system generally encloses the tubular member about the core and the strength member system is wrapped about the shield. Again, the strength members become partially embedded in and cooperate with the plastic jacket to provide the desired bending and tensile properties for the cable. It is within the scope of this invention to cause the longitudinally extending strength members to be preattached to a surface of the shield instead of to a separate carrier tape.

BRIEF DESCRIPTION OF THE DRAWINGS

Other features of the present invention will be more readily understood from the following detailed description of specific embodiments thereof when read in conjunction with the accompanying drawings in which.

DETAILED DESCRIPTION

Figure 1:
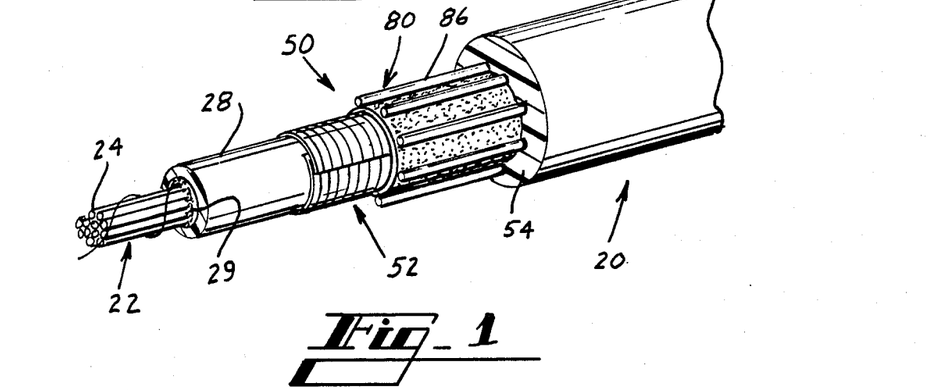
FIG. 1 is a perspective view of a cable of this invention.

Referring now to FIG. 1, there is shown a lightguide cable, which is designated generally by the numeral 20. The cable 20 includes a core 22 which includes a plurality of coated optical fibers 24—24. In one embodiment, the optical fibers 24—24 are assembled into ribbons with a plurality of ribbons being stacked together. See priorly mentioned U.S. Pat. No. 4,557,560 which is incorporated by reference hereinto. In a preferred embodiment, the optical fibers 24—24 are arranged in units with the optical fibers in each unit not being stranded intentionally. Surrounding the core 22 is a tube, 28 that is made of an insulation material such as high density polyethylene. An arrangement of units of non-stranded optical fibers 24—24 enclosed in a loose fitting tube 28 is disclosed and claimed in application Ser. No. 721,533 which was filed on Apr. 10, 1985 in the names of Charles Gartside, Andrew Panuska and P. D. Patel. Typically, the tube 28 has a wall thickness of about 0.030 inch. Also, as can be seen in FIG. 1, the tube 28 may be filled with a suitable waterblocking material 29.

In the prior art, the above-identified enclosed core 22 and tube 28 is surrounded by an inner jacket 31 (see FIGS. 2 and 3), and an intermediate jacket 33 each of which jackets is made of a plastic material. Further, partially embedded in each jacket 31 and 33 are a plurality of longitudinally extending strength members 34—34 which are made of steel, for example. Portions of the strength members are in intimate contact with bedding layers 35—35 to render predetermined surfaces of the strength members sufficiently inaccessible for coupling with the plastic extrudate which is used to provide the overlying jacket. This reduces jacket-wire coupling so that the strength members 34—34 can more readily slide with respect to the jacket plastic during local cable bending. The bedding layers are more fully described in priorly identified U.S. Pat. No. 4,241,979 which is incorporated by reference hereinto.

Figures 2, 3, 4:
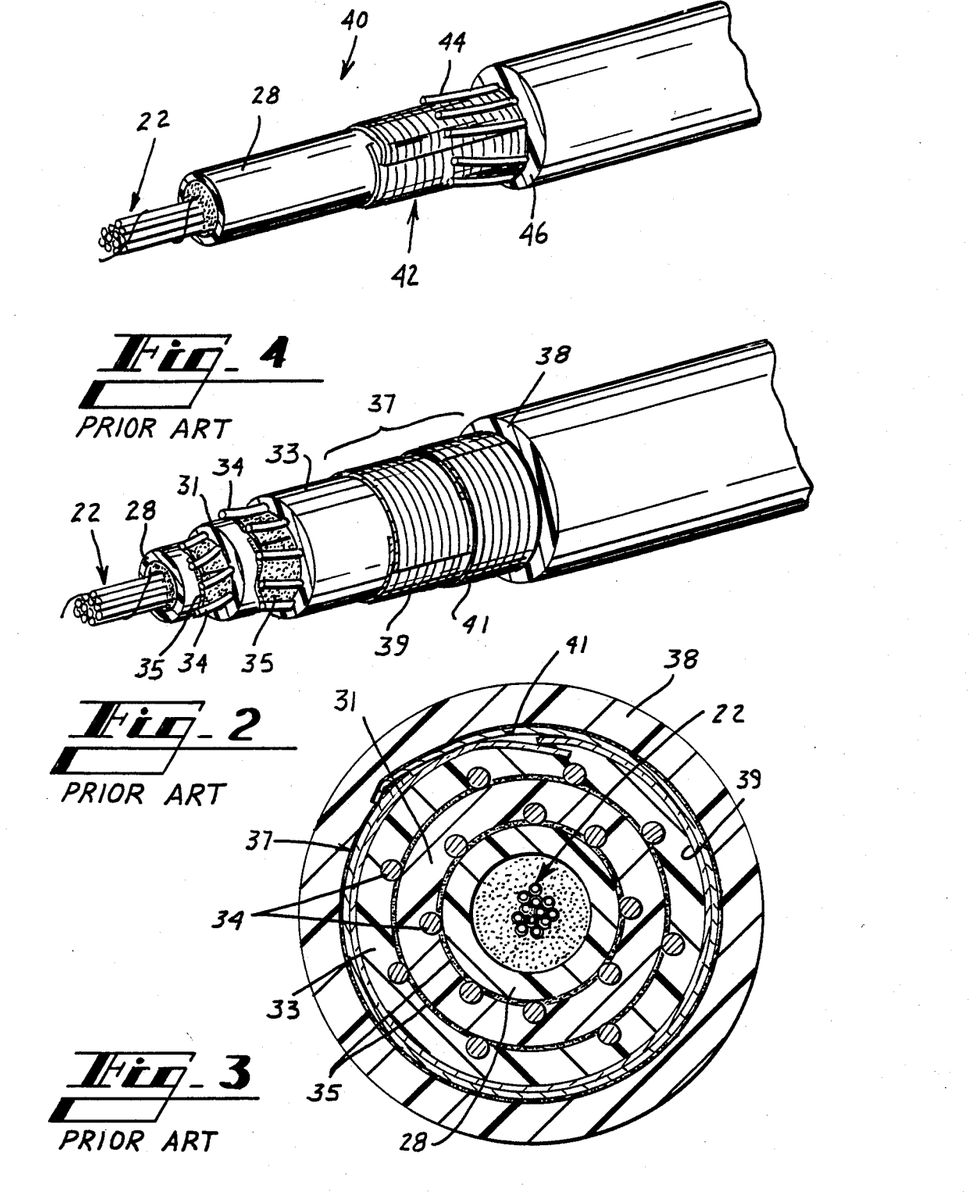
FIG. 2 is a perspective view of a prior art cable.
FIG. 3 is an end sectional view of the prior art cable of FIG. 2.
FIG. 4 is a perspective view of another prior art cable.

The prior art cable of FIGS. 2-3 may also be provided with a shield system 37 which underlies an outer jacket 38. The shield system 37 may include a corrugated inner shield 39 which is made of a metallic material having a relatively high electrical conductivity and which provides the cable with lightning protection. Surrounding the inner shield 39 is an outer shield 41 which is bonded to the jacket 38 to enhance moisture protection and to enhance the mechanical performance of the cable. Typically, it is made of a corrosion-resistant material such as stainless steel, for example, and as such it provides enhanced protection against damage from rodent attack. This cable is disclosed and claimed in priorly mentioned U.S. Pat. No. 4,557,560.

An optical fiber cable 40 which has a significantly smaller diameter than those in the prior art is shown in FIG. 4. In it, the core 22 and tubular member 28 is enclosed by a single metallic shield 42, which may be laminated. A plurality of longitudinally extending strength members 44—44 are disposed in engagement with an outer surface of the shield and are enclosed with a jacket 46 of a plastic material.

For the cable of this invention, the core 22 and tube 28 are enclosed in a sheath system 50 which may vary as to the components and arrangement. The sheath system 50 may include a shield system 52 and an outer jacket 54 which typically has a wall thickness of about 0.050 inch.

For the outer jacket 54, a plastic material such as black high density polyethylene material, having a density in the range of 0.950–0.973 gm/cm$^3$, may be used. This is advantageous inasmuch as these polyethylene materials exhibit excellent properties at low temperatures in the field and are tougher than other polyethylene materials.

The shield system 52 of the preferred embodiment is a corrugated laminate 60 (see FIG. 5) comprising an inner shield 62 which is made of a metallic material such as copper which has a relatively high electrical conductivity to provide lightning protection and an outer shield 64 which is made of a corrosion resistant material such as stainless steel to provide mechanical protection.

Figure 5:
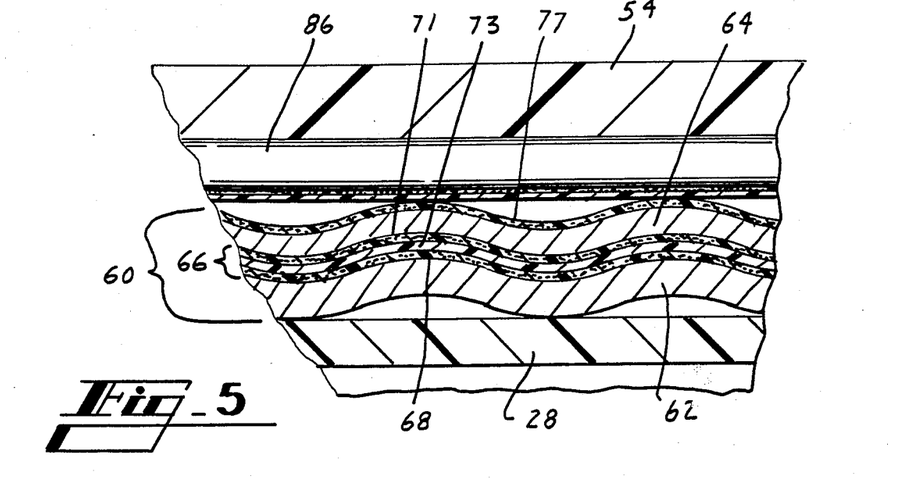
FIG. 5 is a detail view of a portion of a shield system of the cable of FIG. 1.

Bonding between the two metallic layers of the preferred embodiment is accomplished through an adhesive system which is designated generally by the numeral 66 (see FIG. 5). The adhesive system 66 includes three layers of adhesive-like material. A layer 68 of an acrylic acid copolymer material, for example, engages the inner shield 62 and a layer 71 of the same material engages the outer shield 64. A layer 73 of polyethylene plastic material is disposed between the two layers 68 and 71. The layer 73, which has a higher melting point than the materials of the layers 68 and 71, functions as a carrier for those materials to facilitate the laminating of the layers. Typically the inner and outer shields 62 and 64 have thicknesses of 0.005 inch and 0.003 inch, respectively, and the adhesive system has a thickness of 0.003 inch with each of the layers 68, 71, and 73 having a thickness of 0.001 inch.

In the preferred embodiment, the adhesive material of the layers 68 and 71 is a terpolymer which comprises an ethylenically unsaturated carboxylic acid, an ester of an ethylenically unsaturated carboxylic acid and ethylene and which has a thickness of about 0.001 inch. Specifically, the terpolymer comprises about 85–90% by weight of ethylene, about 3–5% by weight of an acrylic acid and an acrylic acid ester. Together, the acrylic acid and the acrylic acid ester comprise about 10–15% by weight of the terpolymer composition. See U.S. Pat. No. 4,122,248 which is incorporated by reference hereinto.

The adhesive system 66 is important to the successful corrugation of the laminate 60. Without it, excessive cold working may occur during corrugating. This could cause excessive corrugation pull-out when the corrugated laminate is advanced through a forming die and the shield to be incapable of resisting bending strains. The adhesive system 66 allows a sufficient degree of freedom between the metallic layers which comprise the shield system so that the metallic layers are capable of sliding with respect to each other as the laminate is advanced through corrugating rolls to avoid excessive cold working.

In the cable of the preferred embodiment of this invention, the shield system has been shown to be a laminate; however, it should be understood that it may take other forms such as a single shield. For example, if only rodent resistance is required, it may be unnecessary to include a copper or other highly conductive metallic material in the shielding system. In that situation, for buried or overhead cables, a shielding system which comprises a 0.005 inch thick stainless steel metallic layer with an adhesive system for bonding to the plastic outer jacket is used. On the other hand, there may be times when a shield is required for lighting protection but when the cable will not be exposed to rodent attacks. In those instances, a copper shield alone will suffice and it is bonded directly to the outer jacket instead of through a stainless steel or other metallic rodent protective layer.

A bonding system may be provided on an outer surface of the outer metallic layer 64. The bonding system includes a layer 77 (see FIG. 5) of acrylic acid copolymer material, for example, which engages the outer surface of the outer metallic layer of the shield and which has a thickness of 0.001 inch. In the preferred embodiment, the layer is made of the same material as the layers 68 and 71.

In the manufacture of the cable 20 of this invention, strength properties are provided by a prefabricated strength member system which is designated generally by the numeral 80 (see FIG. 6) and which is destined to be wrapped longitudinally about the shield system 52 interposed between it and the jacket 54. The prefabricated strength system may be prepared off-line where a carrier tape 82, typically made of Mylar ® plastic tape having an adhesive material 84 on one face thereof is passed over a roller over which strength members 86—86 are being passed. The strength members 86—86 become adhered to the carrier tape 82 and the prefabricated strength system is taken up.

The Mylar ® tape typically has a thickness of 0.001 inch and may be one identified as No. 850 tape which is marketed by the 3M Company. As can be imagined, the adhesive material may be applied to the carrier tape only along the area of engagement of the strength members with the tape. If it is desired to bond the carrier tape to a subsequently applied jacket, the entire outer surface of the tape can be provided with a layer of an adhesive material. Or, in the alternative, the tape can be made of the same plastic material as the jacket.

Figure 6:
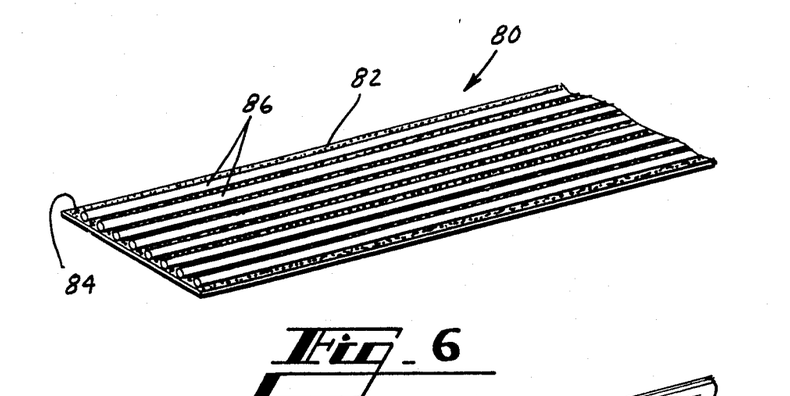
FIG. 6 is a perspective view of one embodiment of a prefabricated strength member system of this invention.

The strength members 86—86 in the preferred embodiment are made of glass impregnated rods or glass rovings. Each of these comprises glass fibers which are held together in a matrix that is made of epoxy or polyurethane, for example. Also, the strength members 86—86 may be made of high tensile strength material such as KEVLAR ® yarn or other synthetically made yarn. In the preferred embodiment, the strength members are glass rods each comprising E glass-impregnated glass fibers with polyurethane being the impregnating material. The outer diameter of each glass rod is about 0.035 inch.

As can be seen in FIG. 1, the prefabricated strength system 80 is caused to be wrapped about the shield system 52. In FIG. 1, the wrapping has been done in a manner to cause the tape 82 to have a longitudinal overlapped seam. As a result, the strength members 86—86 extend longitudinally in a layless manner along the length of the cable.

The strength member system 80 provides the cable with sufficient resistance to tensile and compressive forces to prevent damage to the optical fibers. Tensile forces are applied to the cable during installation. Compressive forces occur, for example, because some presently made cables which are used indoors experience shrink-back problems. These are attributed to some particular high temperature jacketing materials which have been used. In some instances the shrinkage has caused the optical fibers in the cable to buckle. The glass rods of the preferred embodiment cause any such shrinkage to be mimimized. Of course, as might be surmised, this same protection against excessive shrinkage is provided in the standard cross-ply cable.

Another problem of prior art cables which the cable of this invention overcomes relates to the retention of the strength members 86—86 in their original positions as assembled to the cable. Preferably, the strength members 86—86 are spaced equally about the periphery of the core. The strength members desirably should remain in those same positions to maximize the bending proficiency of the cable. Otherwise, optical fiber breaks could occur when the cable is routed in a tortuous path. The placement of the strength members 86—86 on the carrier tape 82 locks them in position and guarantees that their positions relative to one another are maintained at least until the jacket 54 is extruded thereover.

After the jacket 54 is extruded over the strength member system, the jacket plastic forms channels through which the strength members extend. When the cable is bent, the adhesion between the strength members and the carrier tape is overcome and the strength members are capable of moving with respect to the jacket plastic. Of course, if the strength member system is wrapped helically about the core, tensile forces applied to the cable cause the helices of the system to tighten up thereby maintaining the adhesion of the strength members to the carrier tape. It is important that the carrier tape is effective to hold the strength members in a predetermined relationship to one another until after the jacket 54 has been formed.

It should be noted that the tape itself is a carrier for the strength members. For use in some environments, the tape may have special properties. For example, if the cable 20 is to be used as a riser cable in buildings or in plenums, the cable must have particular flame and smoke retardant properties. In order for the cable to meet these properties, the tape is made of a material, such as a woven glass yarn, for example, having relatively high flame and smoke retardant properties.

In another environment, it becomes important to prevent the ingress of moisture into the core of the cable. Of course, the shield system may be formed with a bonded longitudinally overlapped seam and/or the jacket may be bonded to an outer surface of the strength member system. Also, the strength system 80 may be bonded to the shield system 52. This may be accomplished by providing the shield system 52 with the adhesive layer 77 (see FIG. 5).

Advantageously, the bonding system inhibits the diffusion of moisture into the cable and is of help in causing the sheath system to exhibit unitary characteristics. The bonding causes the cable 20 to resist torsional stresses which is particularly important when the cable includes only a single layer of helically extending strength members. Also, the bonding of the outer jacket to the strength system 80 and the strength system to the shield system 52 is of help in providing the cable with rodent protection.

Supplementing these water-blocking provisions, the tape of the strength member system may be made of a material which swells upon exposure to moisture. This is similar to the water-blocking performance of pulp insulation. Such a material is one designated Water Lock L-415 and marketed by the Grain Processing Corp. of Muscatine, Iowa.

Figure 7:
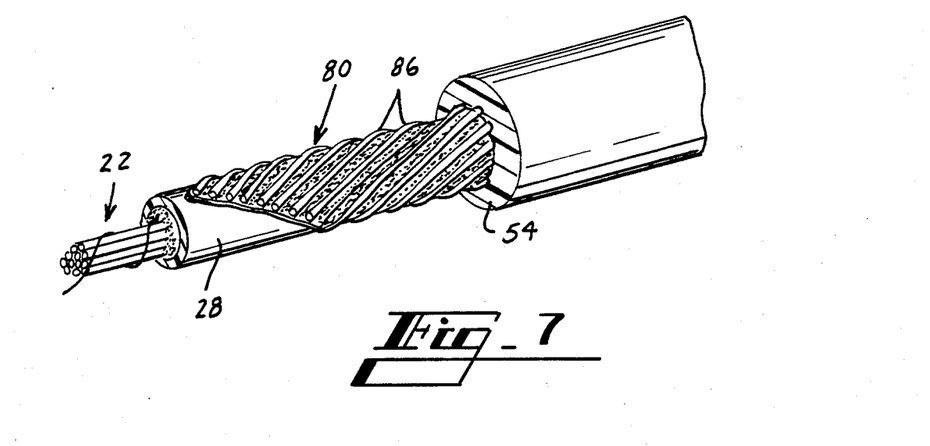
FIG. 7 is a perspective view of another cable of this invention.

Other variations of the strength member system 80 may be used. For example, viewing FIG. 7, it can be seen that the prefabricated system 80 may be wrapped helically about the shield system 52. This causes the strength members 86—86 to have a predetermined lay similar to that shown in the heretofore mentioned cross-ply cables.

Figure 8:
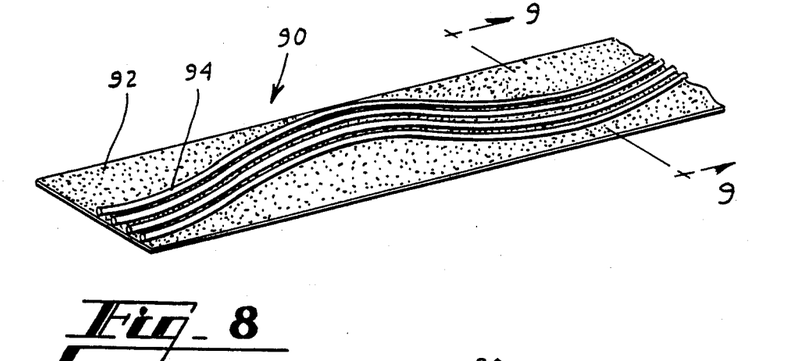
FIG. 8 is a perspective view of a portion of another prefabricated strength system.
Figure 9:
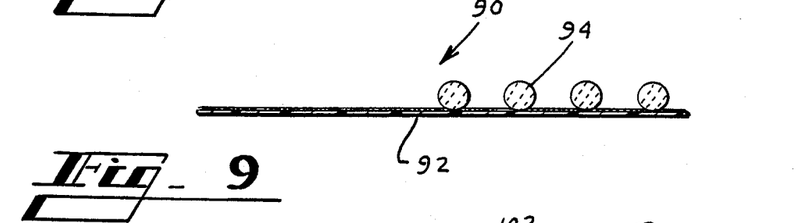
FIG. 9 is an end sectional view of the system of FIG. 8.

Further, as can be seen in FIGS. 8-9, a prefabricated strength system 90 may include a tape 92 and a plurality of undulated strength members 94—94. The strength members are caused to be adhered to a surface of the tape. When the system 90 is wrapped about a cable core with a longitudinal seam, the strength members 94—94 effectively have a reverse oscillated lay.

Figures 10, 11:
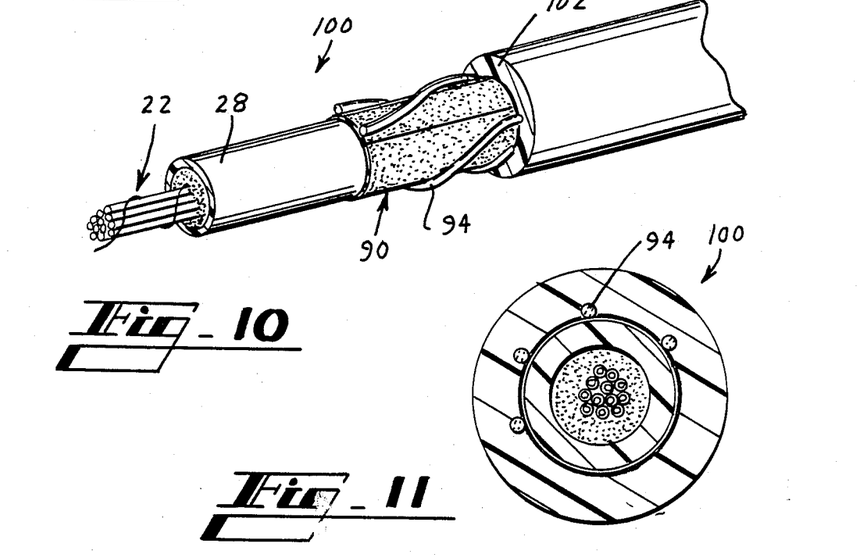
FIG. 10 is a perspective view of another embodiment of the cable of this invention.
FIG. 11 is an end sectional view of the cable of FIG. 10.

As can be seen in FIGS. 10 and 11, a cable 100 includes the prefabricated strength system 90 which is disposed about the tubular member 28. A jacket 102 encloses the strength system 90 with the jacket material at least partially embedding the strength members 94—94. Of course, it should be realized particularly in viewing FIG. 11, that in this arrangement, portions of the cable periphery at any one transverse cross section are not provided with strength members.

It will be recalled that the cross-ply cable disclosed in Gagen U.S. Pat. No. 4,241 979 is a torque balanced cable. In the cable disclosed and claimed in the aforementioned Bohannon, Jr. et al. application Ser. No. 825,291 the absence of oppositely wound helical layers of strength members was compensated for by the capability of the strength members to slide longitudinally relative to the remainder of the sheath system. The cable of this invention may be rendered torsionally balanced by using a strength member system 110 comprising two strength member tapes (see FIGS. 12 and 13). This also overcomes what may be a problem with the embodiment shown in FIG. 11 in some applications wherein bending requirements may mandate that the strength members be disposed about the entire periphery of the cable and not just about a portion thereof.

The strength system 110 includes two carrier tapes 112 and 114 (see FIG. 12) with a plurality of the strength members 116—116 preassembled to each. Adhesive material is used to bond each tape to the strength members. The system 110 is adapted to be wrapped about a cable shield system so that the tape 112 becomes bonded to the shield system through a layer 117 of an adhesive material and so that the tape 114 which has a layer 118 of adhesive thereon becomes bonded to the jacket 54.

Figure 13:
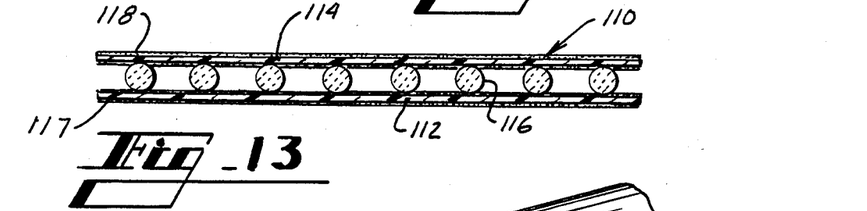
FIG. 13 is an end sectional view of the strength member system of FIG. 12.
Figures 14, 15:
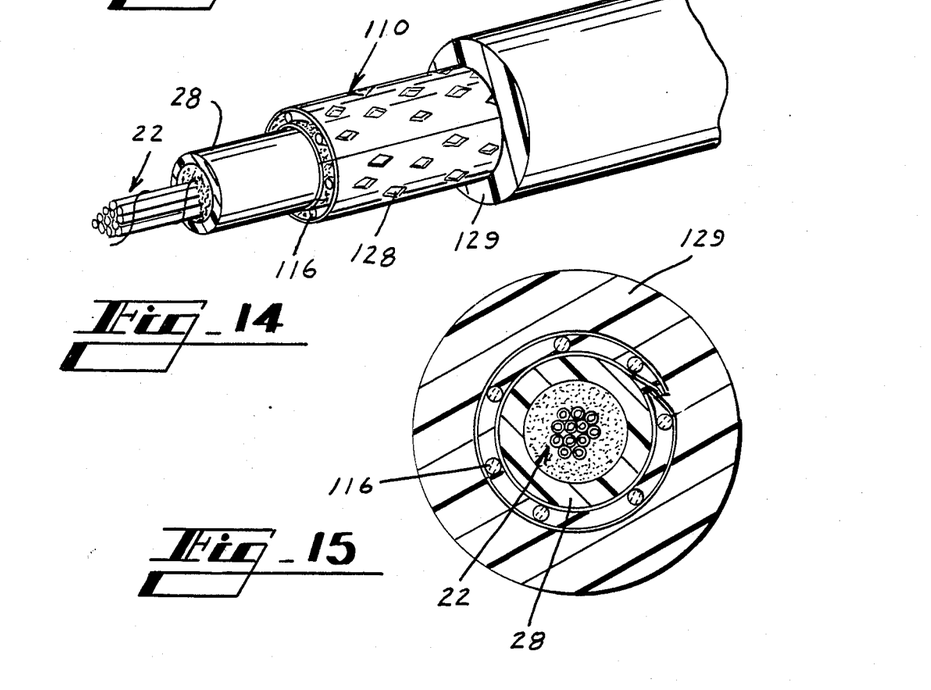
FIGS. 14 and 15 are perspective and end views, respectively, of a cable which embodies the strength system of FIG. 12.

In this embodiment, the strength members are assembled to each carrier tape in an undulated manner. As a result, when the two carrier tapes 112 and 114 are assembled to each other as shown in FIG. 13 and the assembly wrapped about the core (see FIGS. 14 and 15), the cable is a torque-balanced one. The tapes are assembled together so that the strength members cross each other in a repetitive pattern along the length of the cable. As a result, each section of the cable generally has strength members spaced about substantially the entire periphery of the cable.

Further, at least the outer tape 114 is provided with openings 128—128. When the strength system 110 is wrapped about the tubular member 28 and core 22, the openings 128—128 face outwardly to receive portions of the plastic material which forms a jacket 129. This causes the portions of the jacket material to encapsulate portions of the strength members to lock in their positions transversely of the tapes. As in the strength system comprising only one tape and strength members, the strength members in this embodiment are capable of moving longitudinally relative to the jacket upon the application of sufficiently high forces.

Figure 16A:
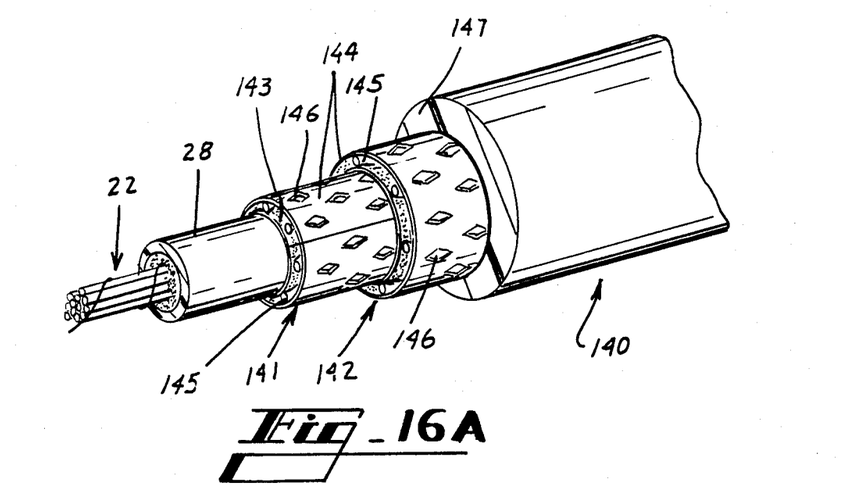
FIGS. 16A and 16B are perspective and end views, respectively, of another cable which embodies the strength system of FIG. 12.
Figure 16B:
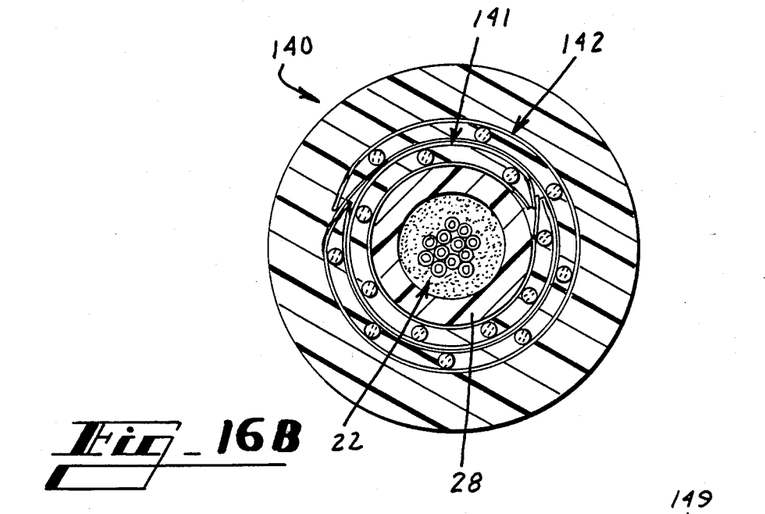

In still another embodiment (see FIGS. 16A and 16B), a cable 140 includes the core 22 and tubular member 28 and two prefabricated strength member systems 141 and 142 with each preferably being a laminate comprising two carrier tapes 143 and 144 and a plurality of strength members 145—145 therebetween. Of course, each system may be of the structure shown in FIG. 12 and include a plurality of openings 146—146 for receiving material of a jacket 147.

Figure 12:
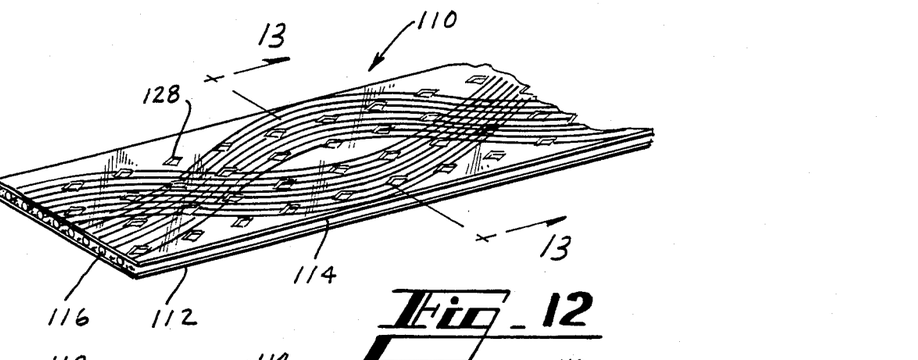
FIG. 12 is a perspective view of still another strength member system.
Figure 17:
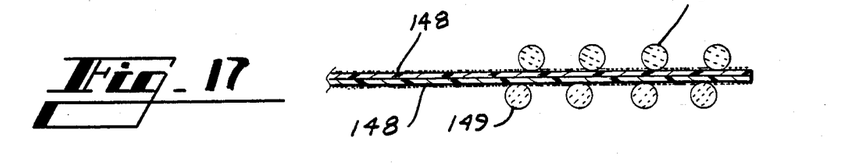
FIG. 17 is an alternate embodiment of a strength member system.

In FIG. 17, there is shown an alternative embodiment of the strength member system shown in FIGS. 12 and 13. Instead of having the two carrier tapes enclosing the strength members in a sandwich type structure as shown in FIGS. 12 and 13, carrier tapes 148—148 are back-to-back and bonded together with strength members 149—149 in straight or undulated configurations on the outer surfaces of the tapes.

Figures 18A, 18B:
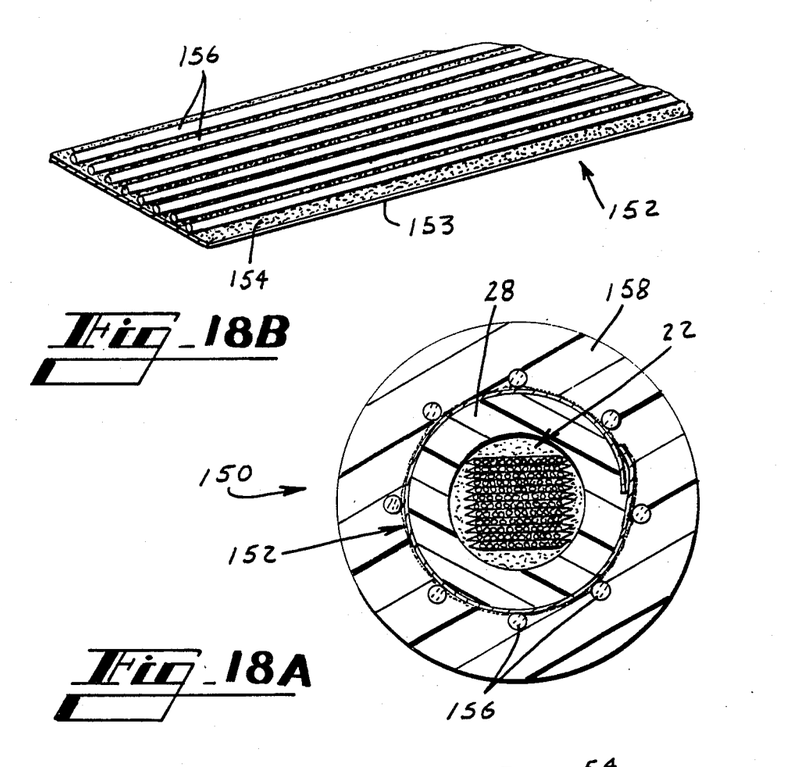
FIGS. 18A and 18B are end and perspective views, respectively, of still another cable and strength member system of this invention.

Hereinbefore, the preferred embodiment of this invention has been described as having a strength member system which is wrapped about a cable shield and enclosed in a plastic jacket. It is also within the scope of this invention to preassemble the strength members to the outer surface of a metallic shield instead of to a separate carrier tape. As seen in FIG. 18A, a cable 150 includes a core 22 of optical fiber ribbons and tubular member 28. A shield system 152 which is wrapped about the tubular member 28 comprises a single shield 153 (see also FIG. 18B) and may comprise one metallic material or a laminate. To an outer surface 154 of the shield system are attached a plurality of strength members 156—156. This may be accomplished by providing the outer surface of the shield system 152 with an adhesive material. A jacket 158 is extruded over the strength members.

Figure 19:
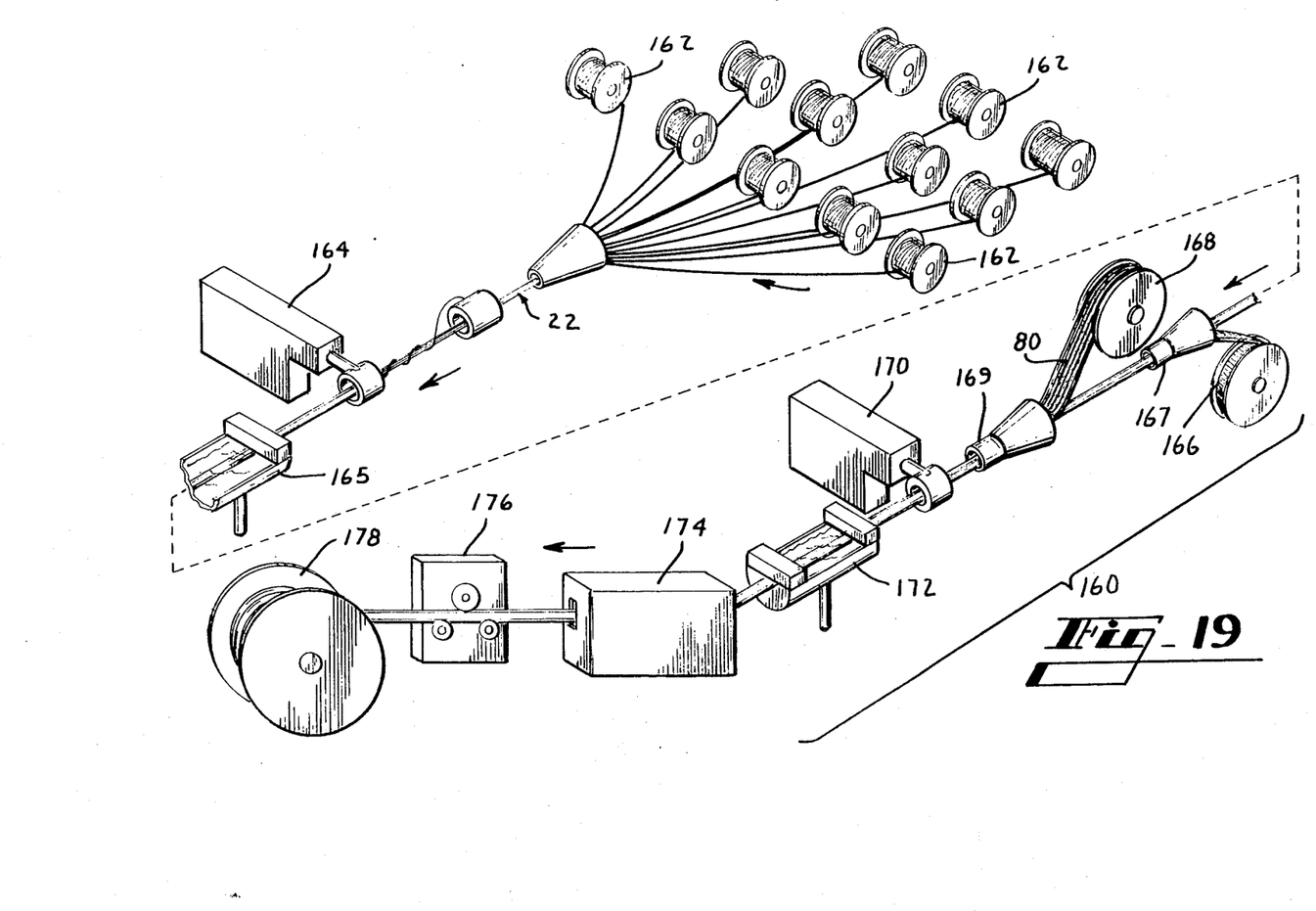
FIG. 19 is a schematic view of a manufacturing line for making cables of this invention.

Referring now to FIG. 19, there is shown an apparatus designated generally by the numeral 160 for manufacturing cables of this invention. For example, the apparatus 160 may be used to manufacture the cable 20 (see FIG. 1). A core 22 is assembled by advancing each of a plurality of optical fibers from a supply 162 and by gathering the fibers together. The core is provided with a binder after which the bound core is advanced through an extruder 164 wherein a plastic material is caused to form the tubular member 28 and through a cooling trough 165. Afterwards, a corrugated metallic tape 166 is caused to be wrapped about the tubular member 28 by a forming device 167.

As the shielded core is advanced along a path of travel, a strength member system 80 comprising the carrier tape 82 and a plurality of strength members 86—86 attached thereto are advanced from a supply 168 into juxtaposition therewith. The prefabricated strength member system 80 is caused to be wrapped about the shield system 52 by a forming device 169. Then an extruder 170 causes a plastic material to enclose the strength member system in the form of the jacket 54. The jacketed core is advanced through a cooling through 172 by a capstan 174, then moved through a marking device 176 and taken up on a reel 178.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber cable, which includes:
   a core which comprises at least one optical fiber;
   a strength member system which is disposed about said core and which includes a carrier tape that encloses said core and a plurality of longitudinally extending strength members spaced about the periphery of the core in a predetermined relationship to one another, said strength member system having sufficient resistance to tensile and compressive forces to prevent damage to the at least one optical fiber; and
   a jacket which is made of a plastic material and which encloses said strength member system, said tape being effective to hold said strength members in the predetermined relationship to one another while said jacket is being caused to enclose said strength member system.

2. The optical fiber cable of claim 1, which also includes a tubular member which encloses said core and which is enclosed by said strength member system.

3. The optical fiber cable of claim 2, wherein said longitudinally extending strength members are equally spaced.

4. The optical fiber cable of claim 3, wherein said strength members are disposed on an outer side of said carrier tape and a binder is wrapped helically about the strength members.

5. The optical fiber cable of claim 3, wherein said longitudinally extending strength members are without an intended lay.

6. The optical fiber cable of claim 5, wherein said strength members are such that they are capable of moving with respect to said jacket when said cable is subjected to tensile forces during handling and installation.

7. The optical fiber cable of claim 3, wherein said longitudinally extending strength members have a predetermined lay and are attached to said tape.

8. The optical fiber cable of claim 7, wherein the strength member tape includes an adhesive material disposed on one side of said tape and the plurality of longitudinally extending strength members are held to said tape by said adhesive material.

9. The optical fiber cable of claim 3, wherein said longitudinally extending strength members have a reverse oscillated lay.

10. The optical fiber cable of claim 3, wherein said tape comprises a material which is moisture absorbant.

11. The optical fiber cable of claim 3, wherein said tape comprises a woven glass material which is flame retardant.

12. The optical fiber cable of claim 11, wherein said woven glass material is impregnated with a plastic material.

13. The optical fiber cable of claim 3, wherein each of said longitudinally extending strength members is made of a metallic material.

14. The optical fiber cable of claim 3, wherein each of said longitudinally extending strength members is made of a yarn.

15. The optical fiber cable of claim 3, wherein said tape is made of a metallic material and forms a shield for said cable.

16. The optical fiber cable of claim 3, which also includes a metallic shield which encloses said tubular member, said carrier tape being wrapped about said shield.

17. The optical fiber cable of claim 3, wherein said strength system is wrapped helically with a binder.

18. The optical fiber cable of claim 3, wherein each of said longitudinally extending strength members comprises a glass rod.

19. The optical fiber cable of claim 2, wherein an outer surface of said tape is provided with a layer of an adhesive material to cause said tape to bond to said jacket.

20. The optical fiber cable of claim 2, wherein said carrier tape is a first carrier tape and said strength member system also includes:
   a second carrier tape and an associated plurality of longitudinally extending strength members spaced about the periphery of the core, the strength members associated with the first carrier tape and with the second carrier tape being undulated; and
   said first tape being assembled to said second tape in a manner which causes the longitudinally extending members of said first tape to cross periodically those of said second tape and provide a laminate of two tapes having the strength members thereof disposed therebetween.

21. The optical fiber cable of claim 20, wherein said first tape of said strength member system faces outwardly and includes a plurality of openings formed therein with portions of the plastic material of said jacket being disposed in said opening to lock circumferentially said strength members about said core.

22. The optical fiber cable of claim 21, wherein said strength member system is a first strength member system and said cable also including a second strength member system which is substantially identical to said first strength member system and which is superimposed on said first strength member system.

23. The optical fiber cable of claim 20, wherein an outer surface of an outer one of said tapes is provided with an adhesive material to cause said strength member system to become bonded to said jacket.

24. A method of making an optical fiber cable, said method comprising the steps of:
   moving a core comprising at least one optical fiber along a path of travel;
   advancing a strength member system comprising a carrier tape and a plurality of longitudinally extending strength members which are attached to the tape in a predetermined relationship to one another into juxtaposition with the core;
   causing successive portions of the strength member system tape to enclose the core; and
   extruding a plastic material about the strength member system to form a jacket.

25. The method of claim 24, which also includes the steps of enclosing the core in a tubular member and causing a metallic tape to be wrapped about the tubular member to form a shield and the strength member system is caused to be wrapped about the shield.

26. The method of claim 24, wherein the carrier tape is a metallic material and provides a shield for the cable as well as being a carrier to which the strength members are attached prior to the strength member system becoming disposed about the core.

27. The method of claim 24, wherein the longitudinally extending strength members which are attached to the carrier tape have an equal spacing between each two adjacent strength members.

28. The method of claim 24, wherein the strength member system disposed about the core is such that the strength members are without an intended lay and the strength members are capable of movement with respect to the jacket when the cable is subjected to tensile forces.

29. The method of claim 24, which also includes the step of wrapping helically a binder about the strength member system prior to said step of extruding a plastic material to form a jacket.

* * * * *